United States Patent
Golan et al.

(10) Patent No.: US 8,532,393 B2
(45) Date of Patent: Sep. 10, 2013

(54) METHOD AND SYSTEM FOR LINE SEGMENT EXTRACTION

(75) Inventors: Oren Golan, Or-Yehuda (IL); Shmuel Kiro, Rehovot (IL); Itshak Horovitz, Rishon Lezion (IL)

(73) Assignee: Verint Systems Ltd., Herzilya Pituach (IL)

( * ) Notice: Subject to any disclaimer, the term of this patent is extended or adjusted under 35 U.S.C. 154(b) by 0 days.

(21) Appl. No.: 13/312,410

(22) Filed: Dec. 6, 2011

(65) Prior Publication Data
US 2012/0082386 A1 Apr. 5, 2012

Related U.S. Application Data

(63) Continuation of application No. 12/053,788, filed on Mar. 24, 2008, now Pat. No. 8,090,204.

(51) Int. Cl.
*G06K 9/46* (2006.01)

(52) U.S. Cl.
USPC .......................................................... 382/194

(58) Field of Classification Search
None
See application file for complete search history.

(56) References Cited

U.S. PATENT DOCUMENTS

| 5,841,903 A * | 11/1998 | Kikuchi | 382/203 |
| 6,788,814 B1 * | 9/2004 | Krtolica | 382/173 |
| 2009/0238458 A1 * | 9/2009 | Golan et al. | 382/173 |

\* cited by examiner

*Primary Examiner* — Brian P Werner
(74) *Attorney, Agent, or Firm* — Andrus, Sceales, Starke & Sawall, LLP

(57) ABSTRACT

A method for extracting line segments from an edge image comprises receiving a digital image comprising a plurality of edge pixels, and processing the plurality of edge pixels using a breadth first search to determine a plurality of breadth first search pixels in a breadth first search order for a connected component. The connected component comprises a plurality of components. The method continues by processing the plurality of breadth first search pixels in an order related to the breadth first search order to determine a plurality of component pixels for at least one component of the plurality of components. Each of the plurality of components comprises a line segment. The method concludes by processing the plurality of component pixels to determine a plurality of line segment pixels for the line segment.

15 Claims, 12 Drawing Sheets

METHOD AND SYSTEM FOR LINE SEGMENT EXTRACTION

RELATED APPLICATIONS

This application is a continuation and claiming the benefit of and priority to U.S. patent application entitled "METHOD AND SYSTEM FOR LINE SEGMENT EXTRACTION," Ser. No. 12/053,788, filed on Mar. 24, 2008 now U.S. Pat. No. 8,090,204, which is incorporated by reference herein.

TECHNICAL FIELD

This invention is related to the field of image processing, and more specifically to the process of line segment extraction within an image processing system.

TECHNICAL BACKGROUND

In image processing, edge detection and line segment (or spline) extraction are often necessary steps for operations including object detection and recognition. For example, many current face detection methods include edge detection and spline extraction as a part of their operation. Edge detection is used to process a digital image into an edge image, where the edge image comprises only edge pixels. Line segment extraction is then used to process the edge image into a plurality of line segments, or splines. Each spline is a straight line segment without any corners. Splines may contact each other at their end points, but not at any other location within the spline.

Since splines are straight lines, they may be easily described mathematically by a line equation, or simply by defining their end points. This allows further image processing operations to operate efficiently for such purposes as object detection and recognition. Speed and accuracy are critical to any method for spline extraction from edge images. Faster spline extraction methods are useful in particular when analyzing video data where new images are captured at the frame rate of the video source. Accuracy may be critical in many different image processing methods since incorrect splines may render latter image processing operations invalid.

OVERVIEW

In an embodiment, a method for extracting line segments from an edge image comprises receiving a digital image comprising a plurality of edge pixels, and processing the plurality of edge pixels using a breadth first search to determine a plurality of breadth first search pixels in a breadth first search order for a connected component. The connected component comprises a plurality of components. The method continues by processing the plurality of breadth first search pixels in an order related to the breadth first search order to determine a plurality of component pixels for at least one component of the plurality of components. Each of the plurality of components comprises a line segment. The method concludes by processing the plurality of component pixels to determine a plurality of line segment pixels for the line segment.

In some embodiments, processing the plurality of edge pixels using a breadth first search to determine a plurality of breadth first search pixels in a breadth first search order for a connected component comprises scanning the digital image until an edge pixel not contained in any previously created connected component is detected, and creating a connected component containing the edge pixel. The digital image is then processed using a breadth first search to produce a list of breadth first search pixels connected to the edge pixel and breadth first search distances to the edge pixel, and the list of breadth first search pixels and breadth first search distances is added to the connected component.

In an embodiment, processing the plurality of breadth first search pixels in an order related to the breadth first search order to determine a plurality of component pixels for at least one component of the plurality of components comprises selecting a connected component, and processing the list of breadth first search pixels from the selected connected component in reverse order, starting from the final breadth first search pixel, to produce the list of components.

Processing the list of breadth first search pixels in reverse order, starting from the final breadth first search pixel, to produce the list of components may comprise selecting a pixel from the list of breadth first search pixels, and determining if the pixel belongs to the end of one or more previously created component. If the pixel does not belong to an end of any previously created component, a new leaf component containing the pixel is created. If the pixel belongs to the end of one previously created component, the pixel is added to the list of component pixels for the one previously created component. If the pixel belongs to more than one previously created component the lengths of each of the more than one previously created component is determined.

If more than one of the previously created components are either non-leaf components or are not shorter than a component threshold, a new non-leaf component containing the pixel is created. If only one of the previously created components is either a non-leaf component or is longer than the component threshold, all of the leaf components that have lengths less than the component threshold are deleted. If none of the previously created components are either non-leaf components or are longer than the component threshold, all of the leaf components that have lengths less than the component threshold are deleted. If all of the previously created components have lengths less than the component threshold, all of the previously created components except for the longest previously created component are deleted and the pixel is added to the longest previously created component.

Processing the plurality of component pixels to determine a plurality of line segment pixels for the line segment may comprise selecting a component from the list of components, selecting a starting pixel from the list of component pixels for the component, and creating a current line segment containing the starting pixel. The list of component pixels for the component is processed in order by selecting a current pixel from the list of component pixels for the component, adding the current pixel to the current line segment, processing the current line segment to produce a current spline representation, calculating a distance between at least some of the pixels in the current line segment and the current spline representation, comparing the distance to a spline threshold, and closing the current line segment and creating a new line segment containing the current pixel if the distance is greater than the spline threshold.

In an embodiment, the component threshold and the spline threshold may be set by a user.

In another embodiment, the image is a processed digital image from a transit system, and at least some of the edges define outlines of human heads.

In a further embodiment an image processing system for extracting line segments from a digital image comprises an interface configured to receive images, and a processor electrically coupled with the interface. The processor is configured to receiving a digital image comprising a plurality of edge pixels, and to process the plurality of edge pixels using a breadth first search to determine a plurality of breadth first search pixels in a breadth first search order for a connected component. The connected component comprises a plurality of components. The processor continues by processing the plurality of breadth first search pixels in an order related to the breadth first search order to determine a plurality of component pixels for at least one component of the plurality of components. Each of the plurality of components comprises a line segment. Finally, the processor processes the plurality of component pixels to determine a plurality of line segment pixels for the line segment.

In a further embodiment, a computer-readable medium having instructions stored thereon for operating a computer system to extract line segments from a digital image is described. The instructions, when executed by the computer system, direct the computer system to receive a digital image comprising a plurality of edge pixels, and process the plurality of edge pixels using a breadth first search to determine a plurality of breadth first search pixels in a breadth first search order for a connected component. The connected component comprises a plurality of components. The instructions, when executed by the computer system, also direct the computer system to process the plurality of breadth first search pixels in an order related to the breadth first search order to determine a plurality of component pixels for at least one component of the plurality of components. Each of the plurality of components comprises a line segment. The instructions, when executed by the computer system, also direct the computer system to process the plurality of component pixels to determine a plurality of line segment pixels for the line segment.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

As discussed above, fast, efficient, and accurate line segment extraction may be critical for a wide variety of image processing methods and systems. These characteristics of line segment extraction may be maximized by using a breadth first search method in processing an edge image into a plurality of connected components, the connected components into a plurality of components, and finally, the components into a plurality of line segments.

Figure 1:
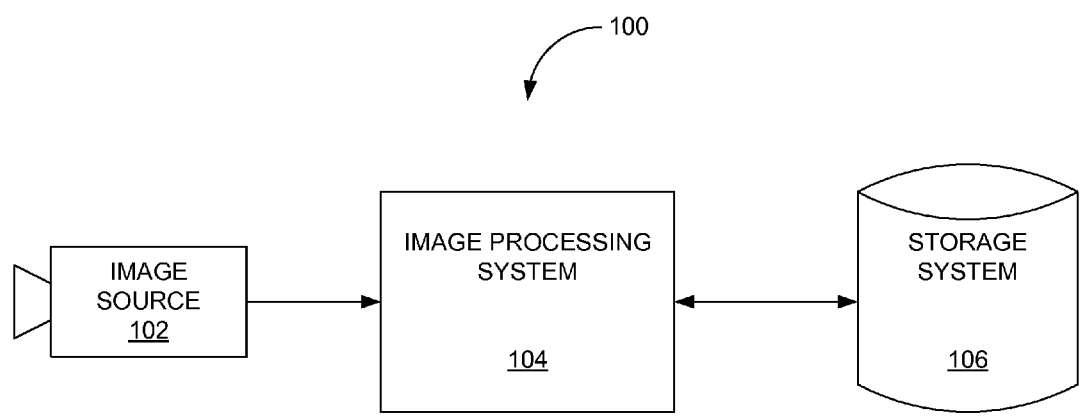
FIG. 1 is a block diagram illustrating an image system for line segment extraction from image data.

FIG. 1 is a block diagram illustrating an image system for line segment extraction from image data. In this example, image source 102 is communicatively coupled with image processing system 104, and provides digital images to image processing system 104. Image processing system 104 is communicatively coupled with storage system 106, and stores digital images and other data on storage system 106, and retrieves digital images and other data from storage system 106. Digital images may be captured by any image source 102 capable of generating digital images, such as, digital cameras, video cameras, or other image capture devices.

Image processing system 104 is configured to extract line segments from edge images. These edge images may be retrieved from storage system 106 or may be the result of prior edge detection processing by image processing system 104. For example, it may be desirable to track the quantity, location, and movement of a variety of people within a series of images. In this example, differentiating between different people is a difficult task simplified by detecting the edges of each person, and converting these edges into a plurality of line segments for further image processing. Some embodiments may only examine portions of the people, such as their heads, since these portions may be easier to differentiate than the bodies of people, particularly when the people are wearing similar clothing. One example use of such a method is in a transit system where image processing is used to analyze the movement of people boarding and leaving a vehicle for such purposes as tracking usage of the system throughout a period of time.

Storage system 106 may be any database, memory, disc drive, or other data storage device configured to store images. Storage system 106 may also be configured to store intermediate data resulting from the various methods for line segment extraction illustrated in FIGS. 2-7, and described in detail below.

Figure 2:
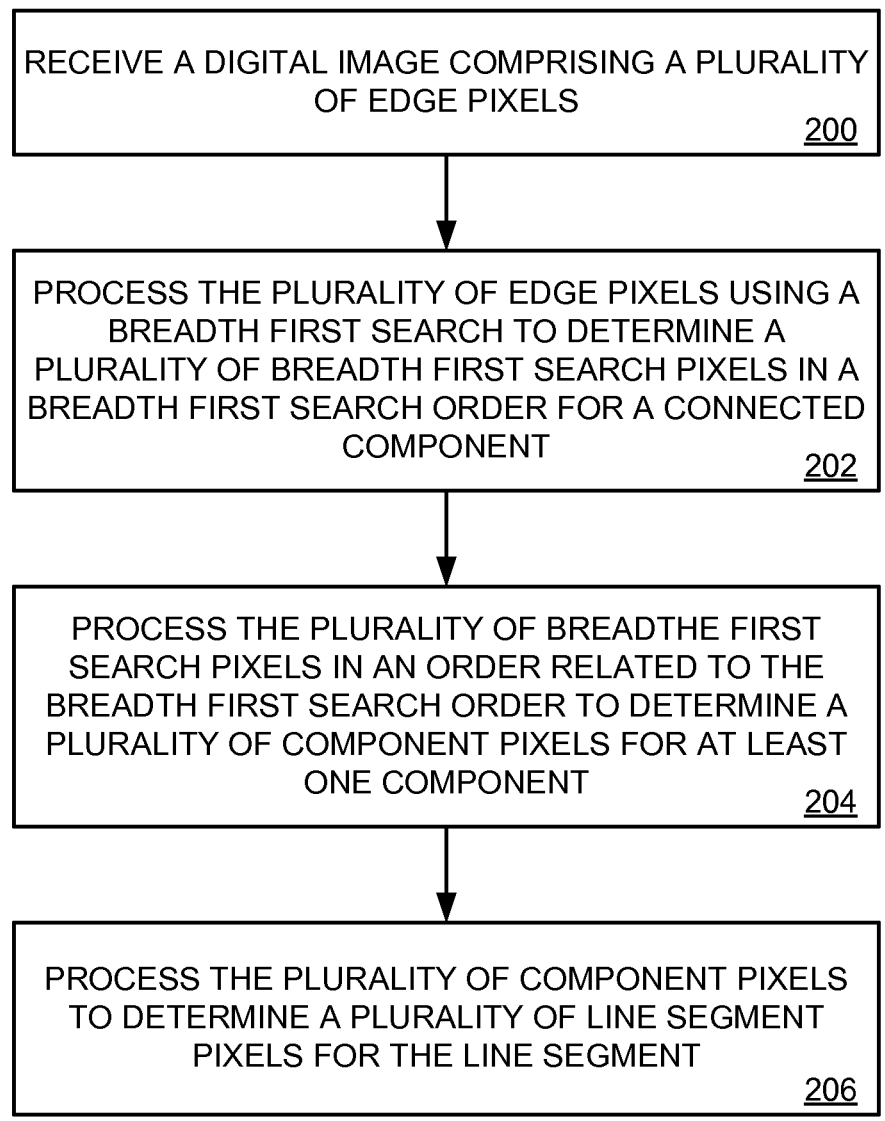
FIG. 2 is a flow diagram illustrating a method for line segment extraction.

FIG. 2 is a flow diagram illustrating a method for line segment extraction. Reference numbers from FIG. 2 are indicated parenthetically below. In this example, a computer system is configured to operate as an image processing system, such as that illustrated by image processing system 104 in FIG. 1. Image processing system 104 receives a digital image comprising a plurality of edge pixels, (operation 200). This digital image may be in any of a wide variety of formats, such as a frame from a video image, a still image, or come from any other image source. In this example, the digital image represents a plurality of edges. These edges may be created from raw images using any of a wide variety of edge detection techniques. In some cases the digital images received by the image processing system, have been processed into edges from raw image data by other image processing systems, or by image processing system 104 in earlier operations.

Image processing system 104 processes the digital image using a breadth first search to determine a plurality of breadth first search pixels in a breadth first search order for a connected component, (operation 202). The connected component comprises a plurality of components. This operation is illustrated in further detail in FIG. 3 and described below.

Further, image processing system 104 processes the plurality of breadth first search pixels in an order related to the breadth first search order to determine a plurality of component pixels for at least one component of the plurality of components, (operation 204). Each component comprises a line segment. In an embodiment, image processing system 104 processes the plurality of breadth first search pixels in reverse order from the breadth first search order. This operation is illustrated in further detail in FIGS. 4-6 and described below.

Also, image processing system 104 processes the plurality of component pixels to determine a plurality of line segment pixels for the line segment, (operation 206). This operation is illustrated in further detail in FIG. 7 and described below.

Figure 3:
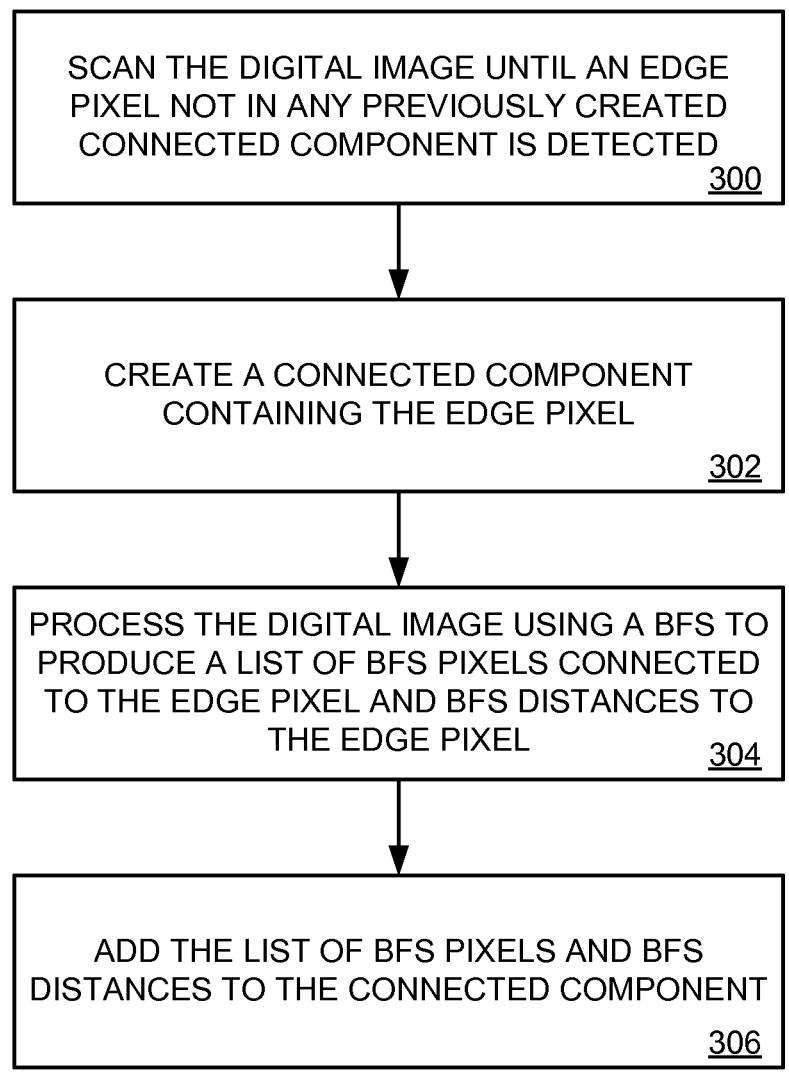
FIG. 3 is a flow diagram illustrating a method for line segment extraction.

FIG. 3 is a flow diagram illustrating a method for line segment extraction. Reference numbers from FIG. 3 are indicated parenthetically below. FIG. 3 illustrates operations used to produce a plurality of breadth first search pixels in a breadth first search order from an initial image comprising edge pixels, represented by operation 202 above. Image processing system 104 scans the digital image until an edge pixel not contained in any previously created connected component is detected, (operation 300). This scanning may be performed in any of a variety of manners such as, for example, scanning each row of pixels from the top of the image to the bottom of the image, or scanning each column of pixels from the left side of the image to the right side of the image.

Once an edge pixel not contained in any previously created connected component is detected, image processing system 104 creates a connected component containing that edge pixel, (operation 302).

Image processing system 104 further processes the digital image using a breadth first search starting at the edge pixel, to produce a list of breadth first search pixels connected to the edge pixel, and breadth first search distances to the edge pixel, (operation 302).

Finally, image processing system 104 adds the list of breadth first search pixels and breadth first search distances from operation 302 to the connected component containing the initial edge pixel, (operation 304). This operation creates a connected component comprising a list of breadth first search pixels and breadth first search distances in a breadth first search order.

Operations 300 through 306 may be repeated as necessary until the entire edge image has been processed to produce all of the connected components contained within the edge image. Other embodiments may process only a portion of the edge image to produce a list of connected components contained within the portion of the edge image. These connected components are then processed to create a plurality of components as illustrated in FIGS. 4-6 and described below.

Figure 4:
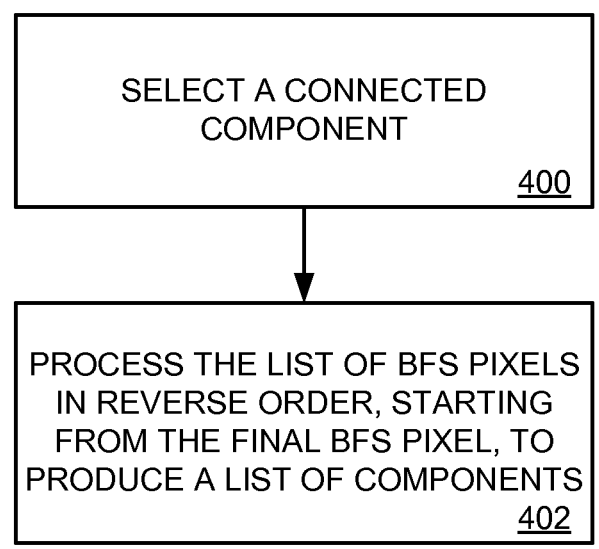
FIG. 4 is a flow diagram illustrating a method for line segment extraction.

FIG. 4 is a flow diagram illustrating a method for line segment extraction. Reference numbers from FIG. 4 are indicated parenthetically below. FIG. 4 illustrates operations used to produce a plurality of component pixels for at least one component, represented by operation 204 above. Each component comprises a list of component pixels. Image processing system 104 first selects a connected component from the list of connected components produced by operation 202, (operation 400).

Image processing system 104 then processes the list of breadth first search pixels in the selected connected component in reverse order, starting from the final breadth first search pixel, to produce a list of components, (operation 402). This process is illustrated in further detail in FIGS. 5 and 6, and described below.

Figure 5:
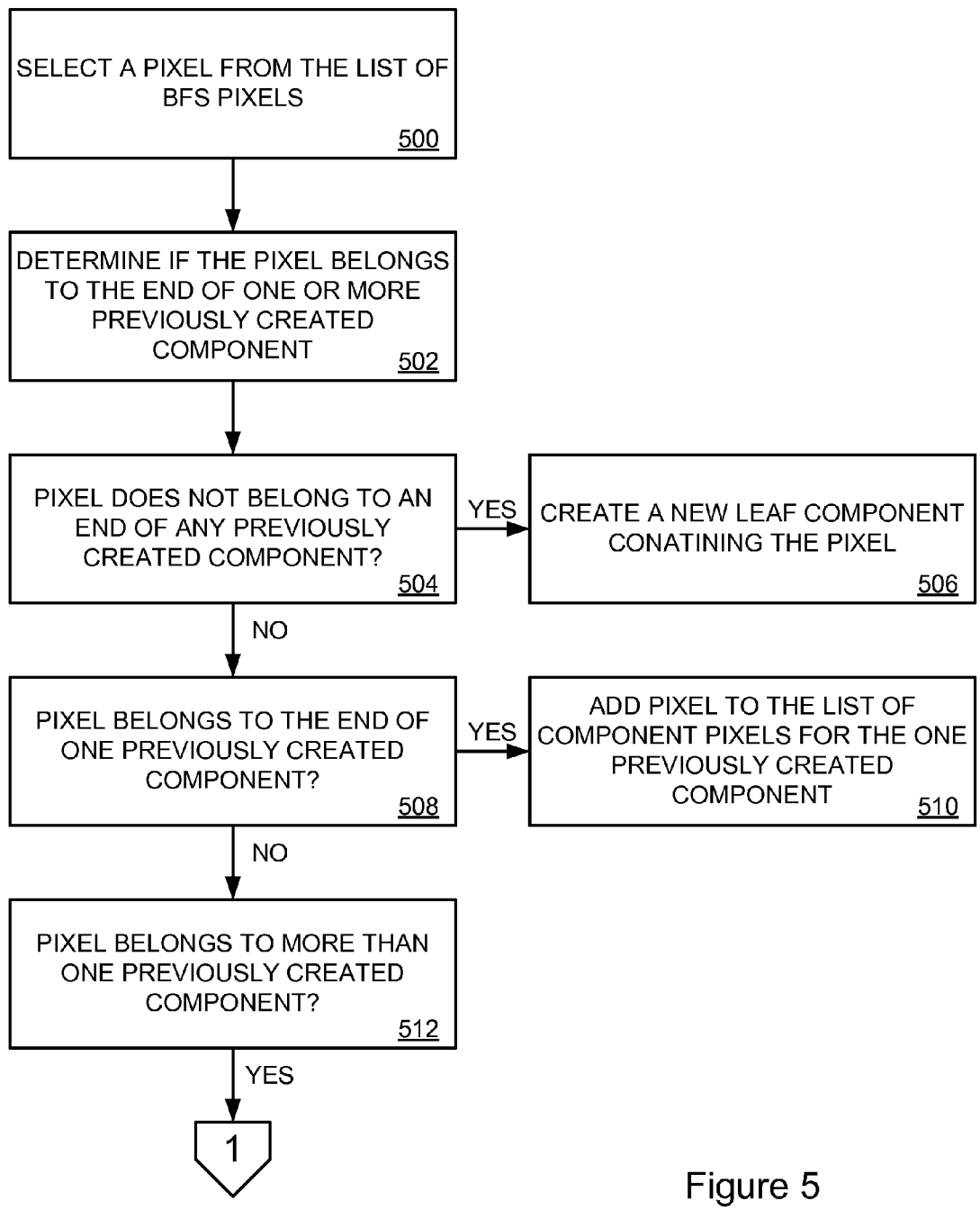
FIG. 5 is a flow diagram illustrating a method for line segment extraction.
Figure 6:
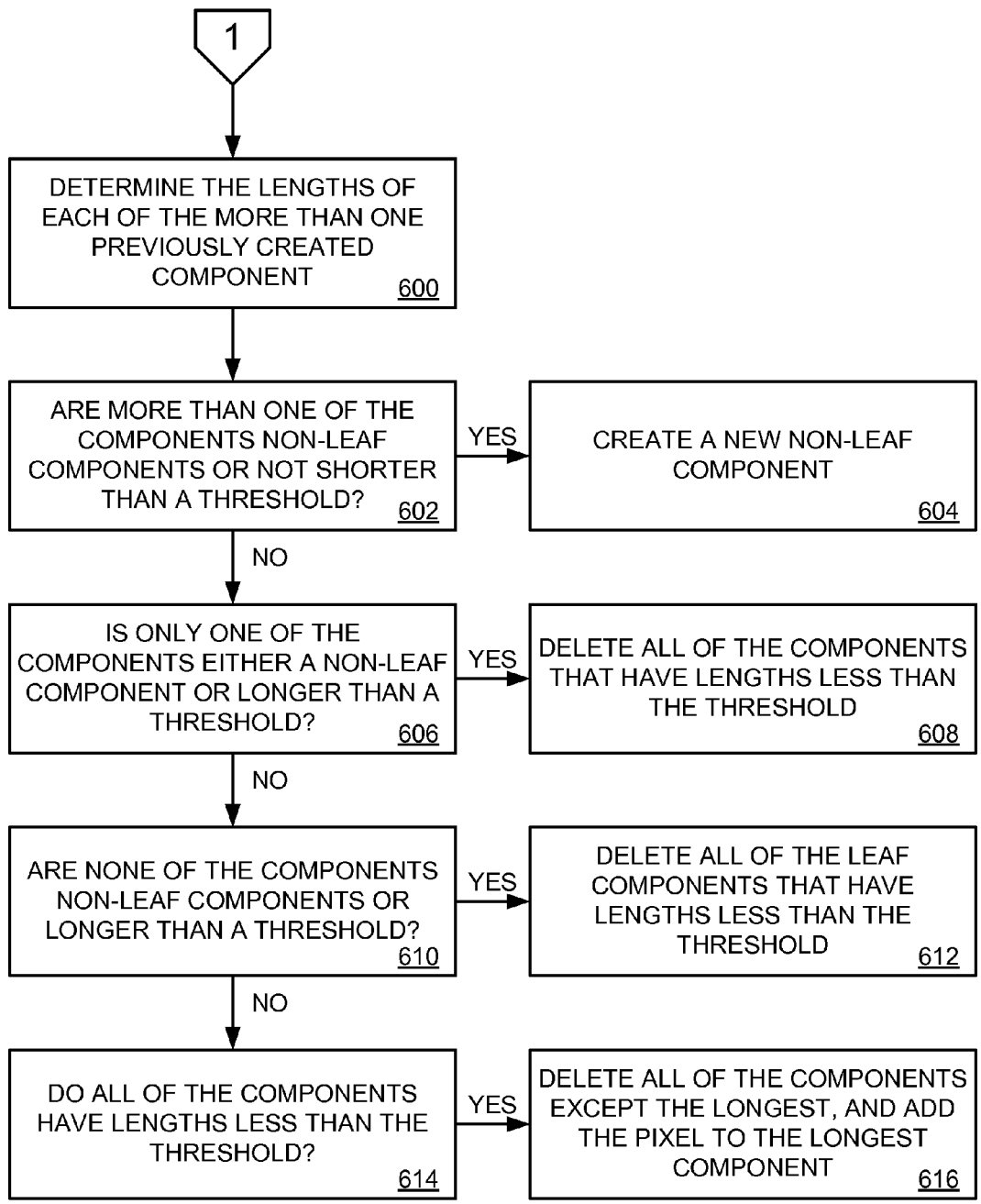
FIG. 6 is a flow diagram illustrating a method for line segment extraction.

FIG. 5 is a flow diagram illustrating a method for line segment extraction. Reference numbers from FIG. 5 are indicated parenthetically below. FIGS. 5 and 6 illustrate operations used to process the list of breadth first search pixels from the selected connected component in reverse order to produce a list of components, represented by operation 402 above. Each component comprises a list of component pixels. Image processing system 104 first selects a pixel from the list of breadth first search pixels from the selected component produced by operation 204, (operation 500).

Image processing system 104 determines if the pixel belongs to the end of one or more previously created component, (operation 502). Image processing system then determines if the pixel does not belong to an end of any previously created connected component, (operation 504). If the pixel does not belong to an end of any previously created connected component, image processing system 104 creates a new leaf component containing the pixel, (operation 506). Otherwise, control passes to operation 508.

Image processing system 104 determines if the pixel belongs to the end of one previously created component, (operation 508). If the pixel belongs to the end of one previously created component, image processing system 104 adds the pixel to the list of component pixels for the one previously created component, (operation 510). Otherwise, control passes to operation 512.

Image processing system 104 determines if the pixel belongs to more than one previously created component, (operation 512), and control passes to operation 600 in FIG. 6.

FIG. 6 is a flow diagram illustrating a method for line segment extraction. Reference numbers from FIG. 6 are indicated parenthetically below. FIG. 6 continues the method for processing the plurality of breadth first search pixels in an order related to the breadth first search order to determine a plurality of component pixels for at least one component illustrated in FIG. 5.

Image processing system 104 determines the lengths of each of the more than one previously created component, (operation 600). These lengths may be represented in any of a variety of ways. For example, in some embodiments the lengths of the more than one previously created component may be measured in pixels.

Image processing system 104 then determines if more than one of the previously created components are either non-leaf components or are not shorter than a component threshold, (operation 602). In some embodiments, the component threshold may be set by a user. If more than one of the previously created components are either non-leaf components or are not shorter than a component threshold, image processing system 104 creates a new non-leaf component containing the pixel, (operation 604). Otherwise, control passes to operation 606.

Image processing system 104 determines if only one or the previously created components is either a non-leaf component or is longer than a component threshold, (operation 606). If only one or the previously created components is either a non-leaf component or is longer than a component threshold, image processing system 104 deletes all of the leaf components that have lengths less than the component threshold, (operation 608). Otherwise, control passes to operation 610.

Image processing system 104 determines if none of the previously created components are either non-leaf components or are longer than the component threshold, (operation 610). If none of the previously created components are either non-leaf components or are longer than the component threshold, image processing system 104 deletes all of the leaf components that have lengths less than the component threshold, (operation 612). Otherwise, control passes to operation 614.

Image processing system 104 then determines if all of the previously created components have lengths less than the component threshold, (operation 614). If all of the previously created components have lengths less than the component threshold, image processing system 104 deletes all of the previously created components except for the longest previously created component, and adds the pixel to the longest previously created component, (operation 616).

Operations 500 through 616 may be repeated as necessary until all of the connected components have been processed to produce all of the components contained within the edge image. Other embodiments may process only a portion of the connected components to produce all of the components contained within this portion of the connected components. These components are then processed to create a plurality of splines as illustrated in FIG. 7 and described below.

Figure 7:
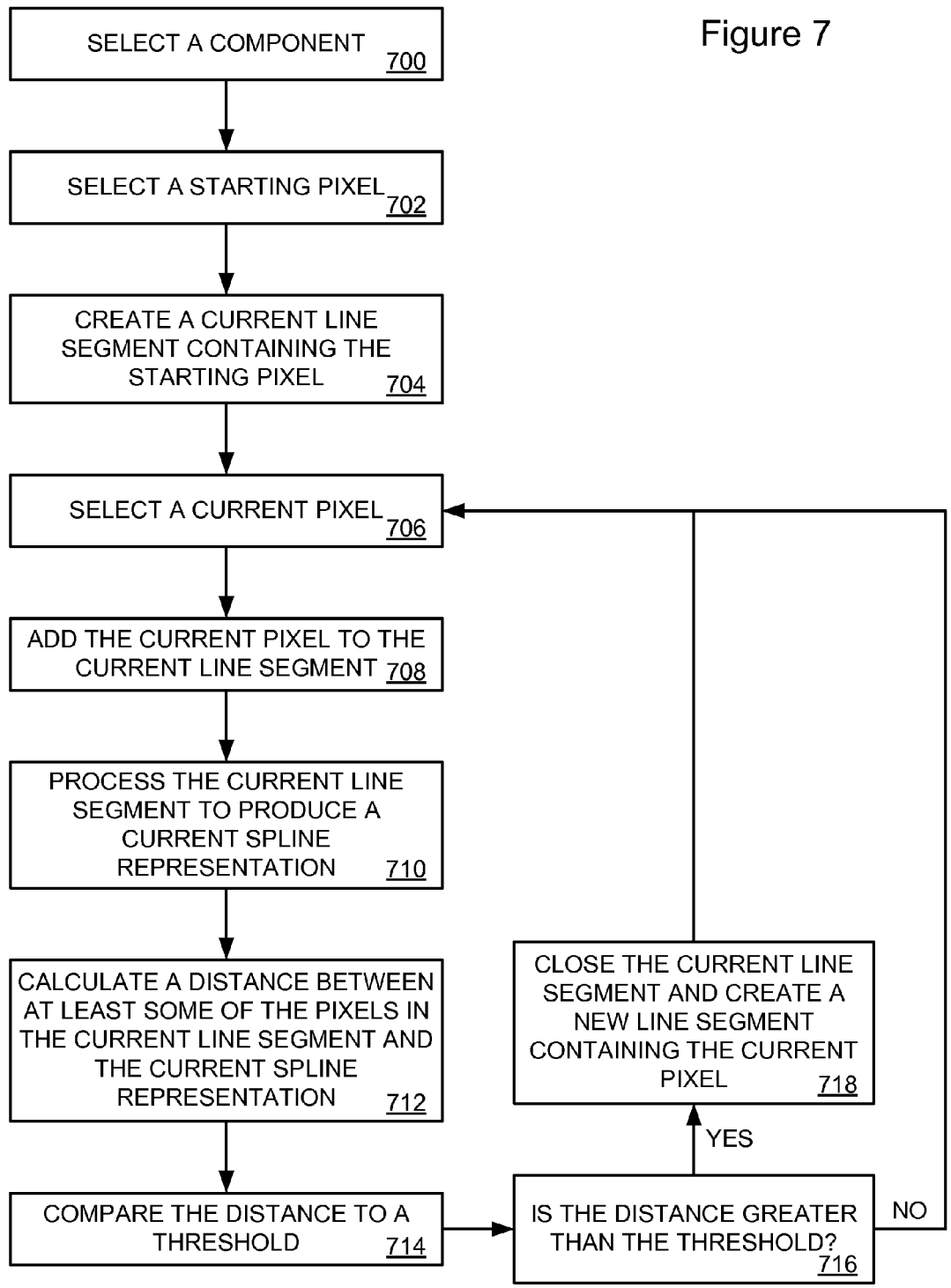
FIG. 7 is a flow diagram illustrating a method for line segment extraction.

FIG. 7 is a flow diagram illustrating a method for line segment extraction. Reference numbers from FIG. 7 are indicated parenthetically below. FIG. 7 illustrates operations used to produce a plurality of line segment pixels for the line segment, represented by operation 206 above. Each line segment comprises a list of pixels. Each line segment is a straight line, and thus may be represented by the two end point pixels. In other examples each line segment may contain all of the pixels within the line segment.

Image processing system 104 starts by selecting a component from the list of components produced by operation 204, (operation 700). Next, image processing system 104 selects a starting pixel from the selected component, (operation 702). Since the list of pixels with the selected component remains in reverse breadth first search order, by selecting a pixel from either the beginning or the end of the list of pixels, one is assured of selecting an end pixel as the starting pixel.

Image processing system 104 creates a current line segment containing the starting pixel, (operation 704). Image processing system 104 then processes the list of component pixels for the component in order from the starting pixel until all of the pixels in the component have been processed.

Image processing system 104 adds the current pixel to the current line segment, (operation 708). Image processing system 104 then processes the current line segment to produce a current spline representation, (operation 710). This current spline representation may be calculated in any of a wide variety of methods such as a linear approximation of the pixels within the line segment.

Image processing system 104 calculates a distance between at least some of the pixels in the current line segment and the spline representation, (operation 712), and then compares the distance to a spline threshold, (operation 714). In some embodiments the spline threshold may be set by a user. The spline threshold represents the maximum amount of error allowed in the spline representation of the edge image. Smaller thresholds allow for smaller amounts of error but result in larger numbers of line segments, slowing later computations. Larger thresholds result in fewer numbers of line segments, but allow larger errors in the spline representation.

Image processing system 104 determines if the distance is greater than the spline threshold, (operation 716). If the distance is greater than the spline threshold, image processing system 104 closes the current line segment and creates a new line segment containing the current pixel, (operation 718). Otherwise, control returns to operation 706 where another pixel is selected from the component until all of the pixels within the component have been processed.

Figure 8:
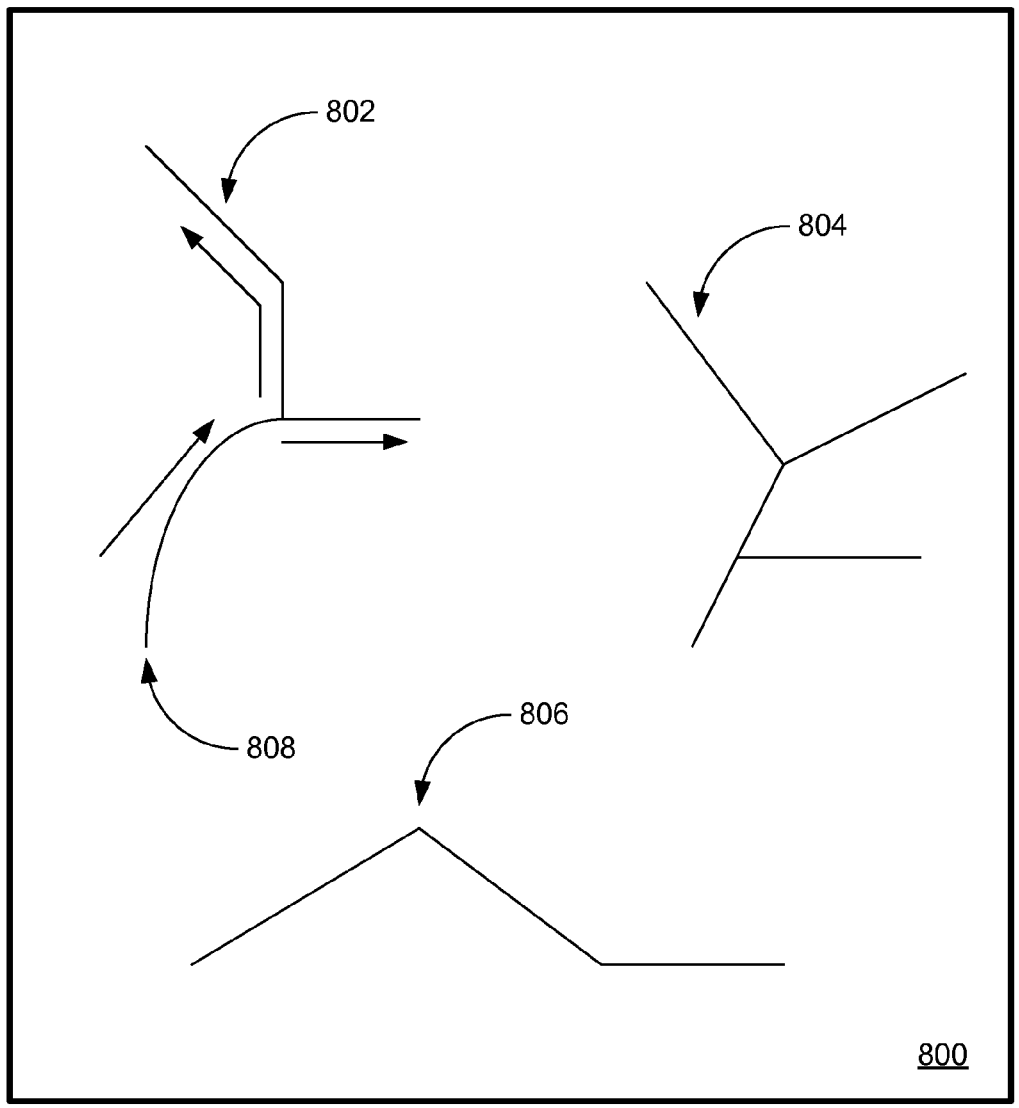
FIG. 8 is a diagram illustrating an image containing a plurality of connected components.

FIG. 8 is a diagram illustrating an image containing a plurality of connected components. This example digital edge image 800 contains three connected components 802, 804, and 806. Digital edge image 800 has been processed into the plurality of connected components by a method such as that of operation 202 from FIG. 2. In this example, connected component 802 is selected for further processing. A breadth first search is performed on connected component 802 from starting pixel 808. The three arrows alongside connected component 802 illustrate the directions taken by the breadth first search in processing the edge image into connected component 802. Connected component 802 is then processed into a one or more component. These components are illustrated in FIG. 9 and described below.

Figure 9:
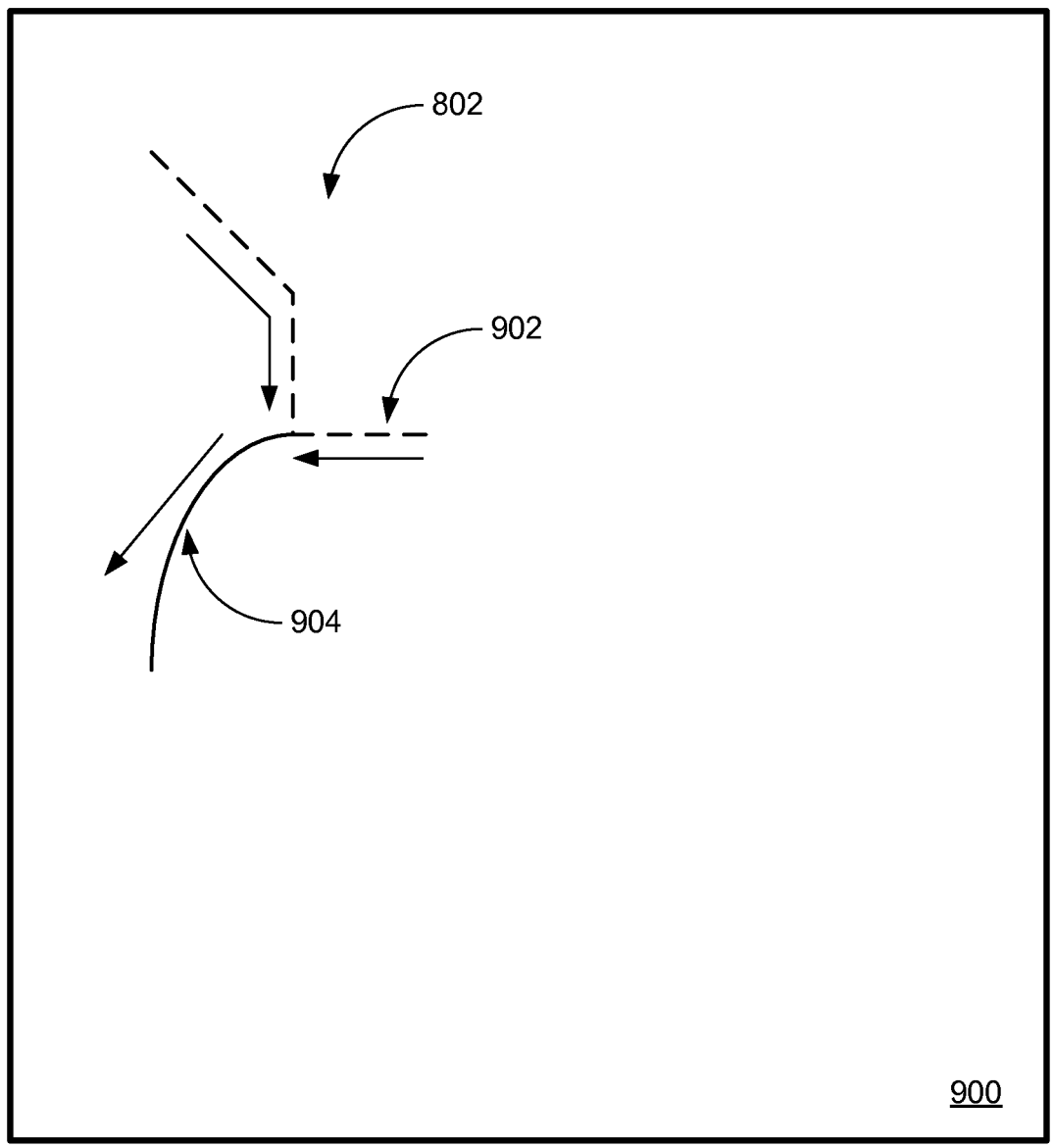
FIG. 9 is a diagram illustrating an image containing a plurality of components.

FIG. 9 is a diagram illustrating an image containing a plurality of components. This example image 900 contains connected component 802 from FIG. 8. Connected component 802 has been processed into two components 902 and 904 by a method such as the one described by operation 204 from FIG. 2. The three arrows along side connected component 802 illustrate the directions taken by operation 204 in processing connected component 802. Note that these directions are in reverse from the breadth first search performed in operation 202. In this example, component 804 is selected for further processing to produce one or more of splines from component 804.

Figure 10:
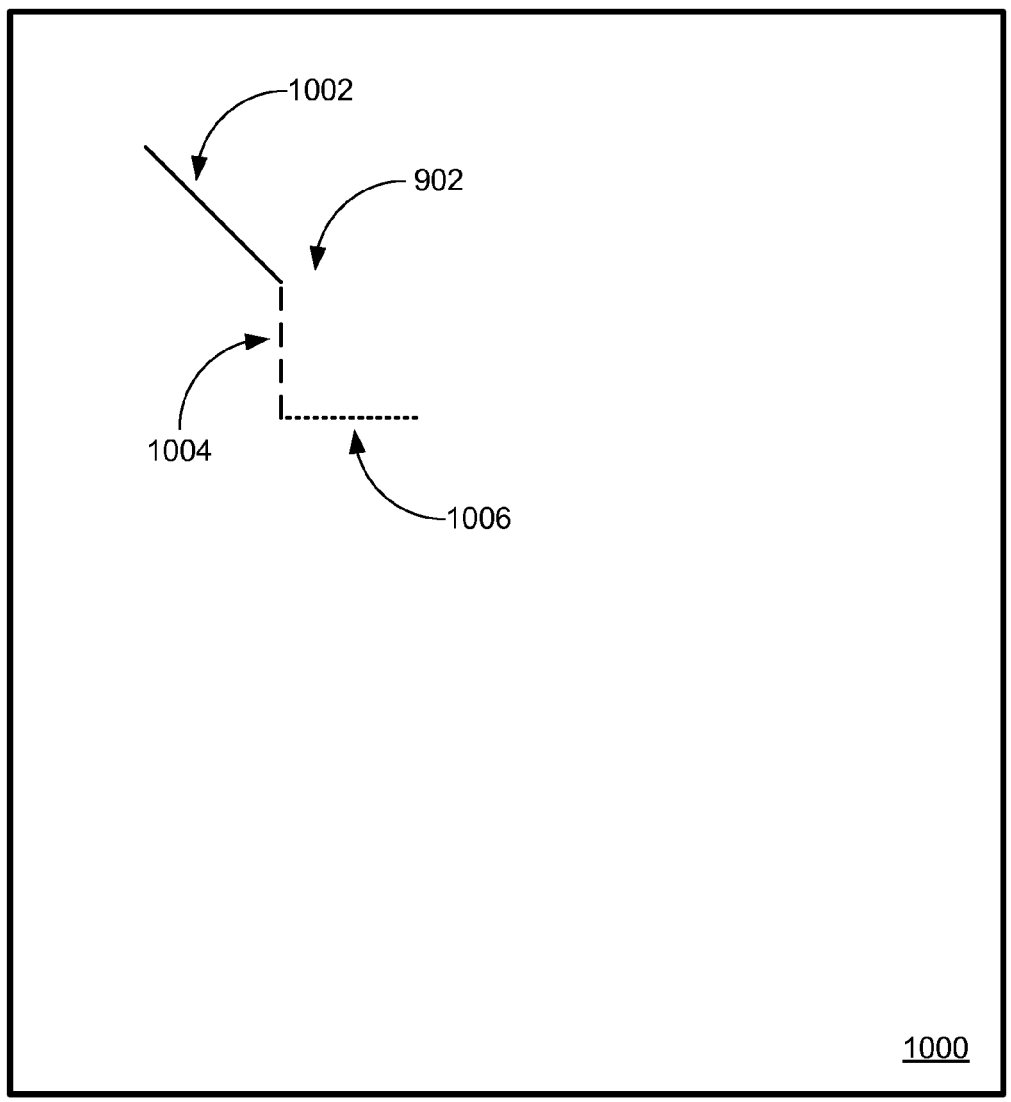
FIG. 10 is a diagram illustrating an image containing a plurality of line segment.

FIG. 10 is a diagram illustrating an image containing a plurality of line segments. This example image 1000 contains component 902 from FIG. 9. Component 902 has been processed into three line segments 1002, 1004, and 1006 by a method such as the one described by operation 206 in FIG. 2. These line segments may now be stored in storage system 106 for further processing.

All of the methods illustrated in FIGS. 2 through 10 may be performed as many times as desired in converting an initial edge image into a plurality of line segments. Some embodiments may not process the entire edge image into line segments, but may instead process only a portion of the edge image. Other embodiments may process the entire edge image into spline representations for later image processing.

The methods, systems, devices, processors, equipment, and servers described above may be implemented with, contain, or be executed by one or more computer systems. The methods described above may also be stored on a computer readable medium for execution by a computer system. Many of the elements of image system 100 may be, comprise, or include computer systems. This includes, but is not limited to image processing system 104 and storage system 106. These computer systems are illustrated, by way of example, in FIG. 11.

Figure 11:
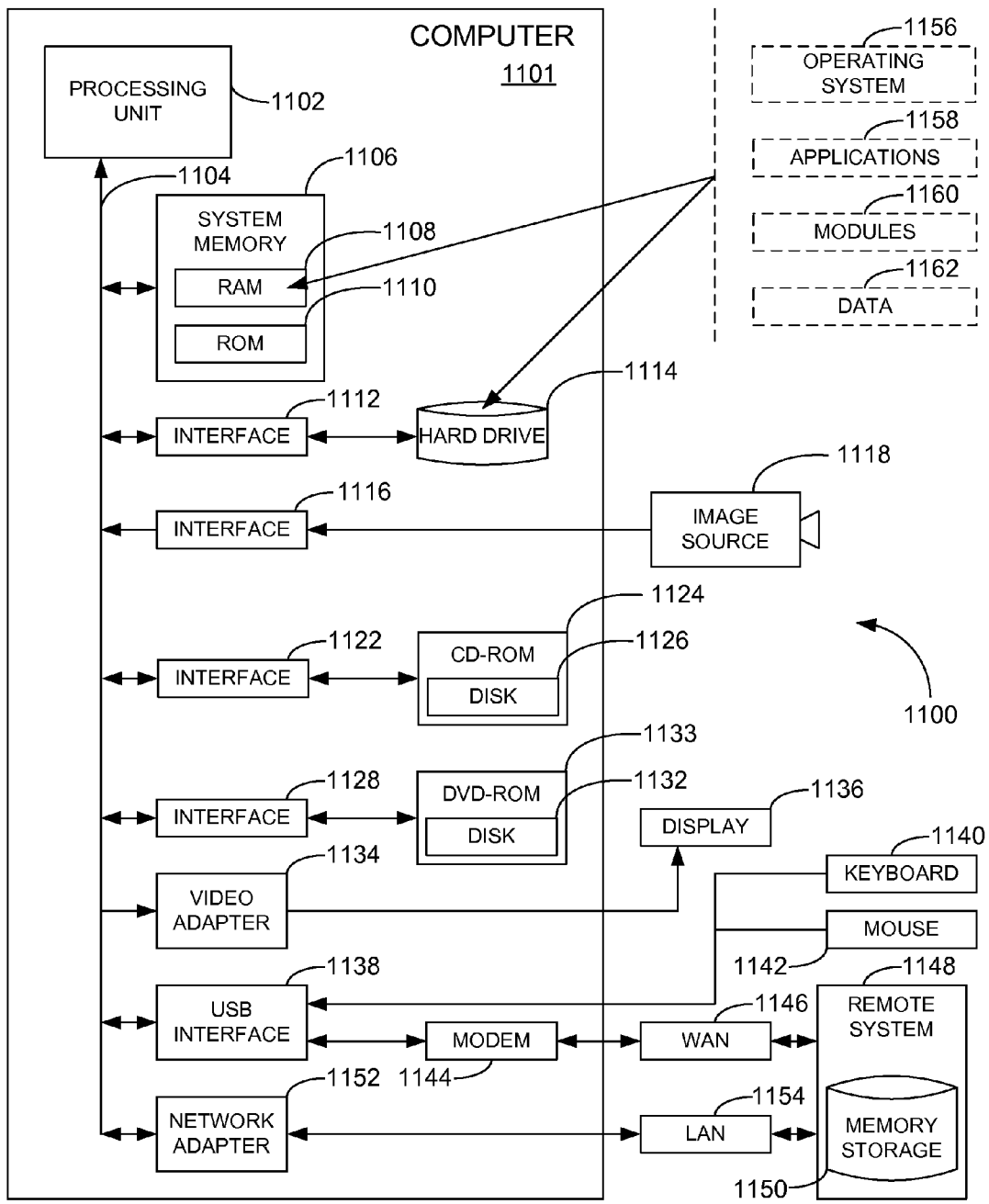
FIG. 11 is a block diagram illustrating a computer system including a computer configured to operate as an image processing system for line segment extraction from a digital image.

FIG. 11 is a block diagram illustrating a computer system 1100 including a computer 1101 configured to operate as an image processing system 104, such as that illustrated in FIG. 1. Computer system 1100 includes computer 1101 which in turn includes processing unit 1102, system memory 1106, and system bus 1104 that couples various system components including system memory 1106 to processing unit 1102. Processing unit 1102 may be any of a wide variety of processors or logic circuits, including the Intel X86 series, Pentium, Itanium, and other devices from a wide variety of vendors. Processing unit 1102 may include a single processor, a dual-core processor, a quad-core processor or any other configuration of processors, all within the scope of the present invention. Computer 1101 could be comprised of a programmed general-purpose computer, although those skilled in the art will appreciate that programmable or special purpose circuitry and equipment may be used. Computer system 1100 may be distributed among multiple devices that together comprise elements 1102-1162.

There are a wide variety of system bus 1104 architectures, such as PCI, VESA, Microchannel, ISA, and EISA, available for use within computer 1101, and in some embodiments multiple system buses may be used within computer 1101. System memory 1106 includes random access memory (RAM) 1108, and read only memory (ROM) 1110. System ROM 1110 may include a basic input/output system (BIOS), which contains low-level routines used in transferring data between different elements within the computer, particularly during start-up of the computer. System memory 1106 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, system memory 1106 may incorporate electronic, magnetic, optical, and/or other types of storage media. Note that system memory 1106 can have a distributed architecture, where various components are situated remote from one another, but can be accessed by processing unit 1102.

Processing unit 1102 receives software instructions from system memory 1106 or other storage elements and executes these instructions directing processing unit 1102 to operate in a method as described herein. These software instructions may include operating system 1156, applications 1158, modules 1160, utilities, drivers, networking software, and data 1162. Software may comprise firmware, or some other form of machine-readable processing instructions.

Computer 1101 also includes hard drive 1114 coupled to system bus 1104 through hard drive interface 1112, CD-ROM drive 1124 containing CD-ROM disk 1126 coupled to system bus 1104 through CD-ROM drive interface 1122, and DVD-ROM drive 1133 containing DVD-ROM disk 1132 coupled to system bus 1104 through DVD-ROM drive interface 1128. There are a wide variety of other storage elements, such as flash memory cards and tape drives, available for inclusion in computer 1101, which may be coupled to system bus 1104 through a wide variety of interfaces. Also, these storage elements may be distributed among multiple devices, as shown here, and also may situated remote from each other, but can be accessed by processing unit 1102.

Computer 1101 further includes video interface 1122 coupled to processing unit 1102 through system bus 1104, configured to receive image data from image source 1124. This image source 1124 may be any combination of digital cameras, video cameras, video players, video recorders, or any other devices capable of transmitting image data to computer 1101. Image source 1124 may correspond to image source 102 shown in FIG. 1.

Computer 1101 also includes video adaptor 1134 configured to drive display 1136, and universal serial bus (USB) interface 1138 configured to receive user inputs from keyboard 1140 and mouse 1142. Other user interfaces could comprise a voice recognition interface, microphone and speakers, graphical display, touch screen, game pad, scanner, printer, or some other type of user device. These user interfaces may be distributed among multiple user devices. USB interface 1138 is also configured to interface with modem 1144 allowing communication with remote system 1148 through a wide area network (WAN) 1146, such as the internet. USB interface 1138 and network adaptor 1152 may be configured to operate as input ports capable of receiving digital images and other data from storage system 106 and as output ports to store digital images and other data associated with the digital images to storage system 106.

Computer 1101 further includes network adaptor 1152 configured to communicate to remote system 1148 through a local area network (LAN) 1145. There are a wide variety of network adaptors 1152 and network configurations available to allow communication with remote systems 1148, and any may be used in other embodiments. For example, networks may include Ethernet connections or wireless connections. Networks may be local to a single office or site, or may be as broad and inclusive as the Internet or Usenet. Remote systems 1148 may include memory storage 1150 in a very wide variety of configurations.

Figure 12:
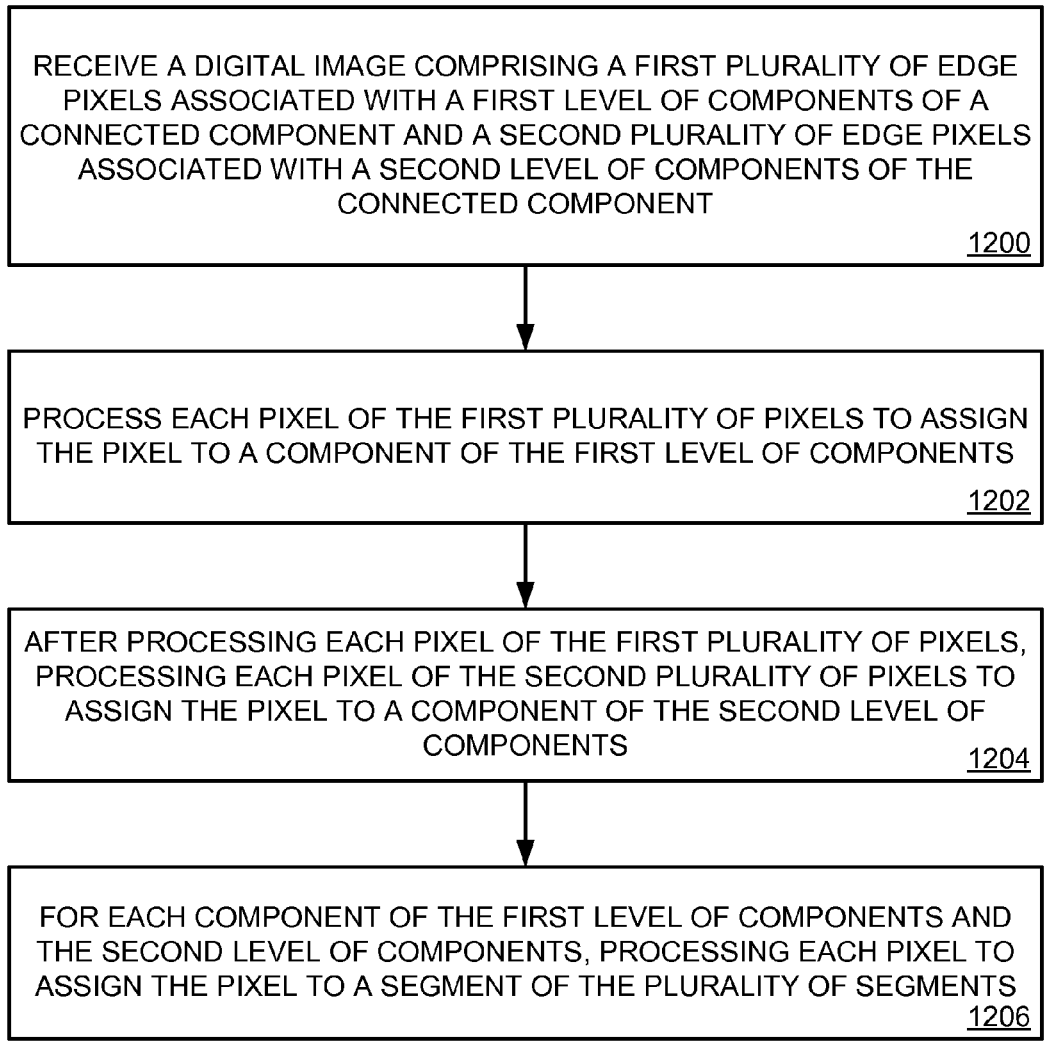
FIG. 12 is a flow diagram illustrating a method for line segment extraction.

FIG. 12 is a flow diagram illustrating a method for line segment extraction. Reference numbers from FIG. 12 are indicated parenthetically below. In this example, a computer system is configured to operate as an image processing system, such as that illustrated by image processing system 104 in FIG. 1. Image processing system 104 receives a digital image comprising a first plurality of edge pixels associated with a first level of components of a connected component and a second plurality of edge pixels associated with a second level of components of the connected component, (operation 1200). This digital image may be in any of a wide variety of formats, such as a frame from a video image, a still image, or come from any other image source. In this example, the digital image represents a plurality of edges. These edges may be created from raw images using any of a wide variety of edge detection techniques. In some cases the digital images received by the image processing system, have been processed into edges from raw image data by other image processing systems, or by image processing system 104 in earlier operations. The first level of components and the second level of components comprise a plurality of segments.

Image processing system 104 processes each pixel of the first plurality of pixels to assign the pixel to a component of the first level of components, (operation 1202).

After processing each pixel of the first plurality of pixels, image processing system 104 processes each pixel of the second plurality of pixels to assign the pixel to a component of the second level of components, (operation 1204).

Finally, for each component of the first level of components and the second level of components image processing system 104 processes each pixel to assign the pixel to a segment of the plurality of segments, (operation 1206).

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a computer system for extracting line segments from a digital image, comprising:
   receiving a digital image comprising a first plurality of edge pixels associated with a first component of a connected component and a second plurality of edge pixels associated with a second component of the connected component, wherein the first component and the second component each include a plurality of segments;
   processing each pixel of the first plurality of pixels to assign the pixel to a portion of the first component;
   after processing each pixel of the first plurality of pixels, processing each pixel of the second plurality of pixels to assign the pixel to a portion of the second component;
   wherein processing each pixel of the first and second plurality of pixels comprises, performing a breadth first search of the first and second plurality of pixels, respectively, to determine a breadth first search order for the first and second plurality of pixels; and
   for each portion of the first component and the second component, processing each pixel to assign the pixel to a segment of the plurality of segments.

2. The method of claim 1, wherein performing the breadth first search of the first and second plurality of pixels, respectively, comprises:
   scanning the digital image until an edge pixel not contained in any previously created connected component is detected;
   creating the connected component containing the edge pixel;
   processing the digital image using the breadth first search starting from the edge pixel to produce a list of breadth first search pixels connected to the edge pixel and breadth first search distances to the edge pixel; and
   adding the list of breadth first search pixels and breadth first search distances to the connected component.

3. The method of claim 1, wherein the first and second plurality of pixels are assigned to the components of the first and second level of components, respectively, in the breadth first search order.

4. The method of claim 1, wherein the first and second plurality of pixels are assigned to the components of the first and second level of components, respectively, in a reverse order of the breadth first search order.

5. The method of claim 1, wherein the image is a processed digital image from a transit system, and at least some of the edges define outlines of human heads.

6. An image processing system for extracting line segments from a digital image, comprising:
   an interface configured to receive digital images; and
   a processor electrically coupled with the interface;
   wherein the processor is configured to:
      receive a digital image comprising a first plurality of edge pixels associated with a first component of a connected component and a second plurality of edge pixels associated with a second component of the connected component, wherein the first component and the second component include a plurality of segments;
      process each pixel of the first plurality of pixels to assign the pixel to a portion of the first component;
      after processing each pixel of the first plurality of pixels, process each pixel of the second plurality of pixels to assign the pixel to a portion of the second component;
   wherein the processor is configured to process each pixel of the first and second plurality of pixels by, performing a breadth first search of the first and second plurality of pixels, respectively, to determine a breadth first search order for the first and second plurality of pixels; and
   for each portion of the first component and the second component, process each pixel to assign the pixel to a segment of the plurality of segments.

7. The image processing system of claim 6, wherein performing the breadth first search of the first and second plurality of pixels, respectively, comprises:
   scanning the digital image until an edge pixel not contained in any previously created connected component is detected;
   creating the connected component containing the edge pixel;
   processing the digital image using the breadth first search starting from the edge pixel to produce a list of breadth first search pixels connected to the edge pixel and breadth first search distances to the edge pixel; and
   adding the list of breadth first search pixels and breadth first search distances to the connected component.

8. The image processing system of claim 6, wherein the processor is configured to assign the first and second plurality of pixels to the components of the first and second level of components, respectively, in the breadth first search order.

9. The image processing system of claim 6, wherein the processor is configured to assign the first and second plurality of pixels to the components of the first and second level of components, respectively, in a reverse order of the breadth first search order.

10. The image processing system of claim 6, wherein the image is a processed digital image from a transit system, and at least some of the edges define outlines of human heads.

11. A non-transitory computer-readable medium having instructions stored thereon for operating a computer system to extract line segments from a digital image, wherein the instructions, when executed by the computer system, direct the computer system to:
- receive a digital image comprising a first plurality of edge pixels associated with a first component of a connected component and a second plurality of edge pixels associated with a second component of the connected component, wherein the first component and the second component each include a plurality of segments;
- process each pixel of the first plurality of pixels to assign the pixel to a portion of the first component;
- after processing each pixel of the first plurality of pixels, process each pixel of the second plurality of pixels to assign the pixel to a portion of the second component;
- wherein processing each pixel of the first and second plurality of pixels comprises, performing a breadth first search of the first and second plurality of pixels, respectively, to determine a breadth first search order for the first and second plurality of pixels; and
- for each portion of the first component and the second component, process each pixel to assign the pixel to a segment of the plurality of segments.

12. The computer-readable medium of claim 11, wherein performing the breadth first search of the first and second plurality of pixels, respectively, comprises:
- scanning the digital image until an edge pixel not contained in any previously created connected component is detected;
- creating the connected component containing the edge pixel;
- processing the digital image using the breadth first search starting from the edge pixel to produce a list of breadth first search pixels connected to the edge pixel and breadth first search distances to the edge pixel; and
- adding the list of breadth first search pixels and breadth first search distances to the connected component.

13. The computer-readable medium of claim 11, wherein the first and second plurality of pixels are assigned to the components of the first and second level of components, respectively, in the breadth first search order.

14. The computer-readable medium of claim 11, wherein the first and second plurality of pixels are assigned to the components of the first and second level of components, respectively, in a reverse order of the breadth first search order.

15. The computer-readable medium of claim 11, wherein the image is a processed digital image from a transit system, and at least some of the edges define outlines of human heads.

* * * * *